(12) United States Patent  
Perko et al.

(10) Patent No.: US 11,731,504 B2  
(45) Date of Patent: Aug. 22, 2023

(54) SYSTEM AND METHOD FOR DIAGNOSING INTEGRITY OF A CRYOGENIC FUEL TANK

(71) Applicant: Caterpillar Inc., Peoria, IL (US)

(72) Inventors: Joshua Thomas Perko, Washington, IL (US); Matthew Jordan Engfehr, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 250 days.

(21) Appl. No.: 17/173,035

(22) Filed: Feb. 10, 2021

(65) Prior Publication Data

US 2022/0250465 A1    Aug. 11, 2022

(51) Int. Cl.  
*B60K 15/03*      (2006.01)

(52) U.S. Cl.  
CPC .... *B60K 15/03* (2013.01); *B60K 2015/03013* (2013.01); *B60K 2015/03217* (2013.01)

(58) Field of Classification Search  
CPC .......... B60K 15/03; B60K 2015/03013; B60K 2015/03217  
See application file for complete search history.

(56) References Cited

U.S. PATENT DOCUMENTS

| | | | |
|---|---|---|---|
| 8,831,857 B2 | 9/2014 | Nolan et al. | |
| 9,064,401 B2 | 6/2015 | Grant et al. | |
| 11,493,378 B2* | 11/2022 | Perko | G01F 23/14 |
| 2016/0222859 A1 | 8/2016 | Hogan | |
| 2018/0118108 A1* | 5/2018 | Engfehr | F17C 9/02 |
| 2019/0376826 A1* | 12/2019 | Thomas | G01F 23/24 |

FOREIGN PATENT DOCUMENTS

| | | |
|---|---|---|
| DE | 102018002072 A1 | 10/2018 |
| DE | 102019201177 A1 | 7/2020 |

* cited by examiner

*Primary Examiner* — Kevin A Lathers  
(74) *Attorney, Agent, or Firm* — Lee & Hayes, P.C.

(57) ABSTRACT

A fuel system for a machine may include a fuel tank configured to hold cryogenic fuel, a pressure sensor, and an electronic control module (ECM). The ECM may determine a change in pressure of the fuel between a first time and a second time, determine a predicted change in pressure of the fuel between the first time and the second time, and determine that the change in pressure and the predicted change in pressure is greater than a threshold. Based on the change in pressure and the predicted change in pressure being greater than the threshold, a notification may be displayed associated with an integrity of the fuel tank.

18 Claims, 6 Drawing Sheets

SYSTEM AND METHOD FOR DIAGNOSING INTEGRITY OF A CRYOGENIC FUEL TANK

TECHNICAL FIELD

The present disclosure relates a system for measuring pressure within a tank of a machine. More specifically, the present disclosure relates to a system for measuring pressure within a tank to determine a deterioration of the tank.

BACKGROUND

Machines, such as mining trucks, loaders, dozers, or other construction and mining equipment, are frequently used for building, construction, mining and other activities. For example, mining trucks are often used for hauling mined materials from mining sites. In some instances, alternative fuels, such as liquified natural gas (LNG) may be used to power these machines. Machines powered using LNG, for example, benefit from reduced carbon (e.g., carbon dioxide), particulate (e.g., diesel soot), nitrous oxide (e.g., NOx), and/or organic (e.g., volatile organic compounds (VOC)) emissions relative to traditional fuel (e.g., diesel, gasoline, etc.) powered machines. Additionally, LNG powered machines provide desirable performance attributes, such as relatively high-power output, an advantageous torque profile, etc. relative to machines powered with traditional fuels.

While machines powered with LNG may offer various environmental and power advantages, measuring and storing LNG in existing machine fuel tanks can pose challenges. For example, since LNG needs to be kept in relatively cold and pressurized environments, tanks holding LNG typically employ a multi-layered configuration in order to provide a relatively high level of thermal insulation. However, cracks within these tanks may jeopardize the insulating properties of such tanks, and can result in a loss of vacuum. In such instances, there is a risk that the pressure within such tanks may increase and the LNG may boil off. For example, with cracks, vacuum loss, and/or boil off, it is desirable to be able to accurately measure and/or predict the tank vacuum life.

One mechanism for measuring a quality of a vacuum in a LNG tank is described in German Application No. 102018002072 (hereinafter referred to as "the '072 reference"). The '072 reference describes measuring a pressure increase within a container over a time interval, and comparing the pressure increase with an expected pressure increase. As explained in the '072 reference, in some instances the comparison may indicate that the container is characterized by a poor vacuum or by poor insulation. However, the system described in '072 reference is not configured to identify other useful characteristics of the container such as an estimated hold time, a remaining useful life of the container, and the like. As a result, the comparison described in the '072 reference may cause operators of the system to prematurely decommission the described containers, thereby reducing the efficiency of the system, and increasing overall maintenance and operating costs associated with the system.

Examples of the present disclosure are directed toward overcoming one or more of the deficiencies noted above.

SUMMARY

According to a first aspect, a machine may include an engine, a fuel tank configured to hold a cryogenic fuel associated with the engine, a pressure sensor fluidly connected to the fuel tank, a temperature sensor, a fuel sensor fluidly connected to the fuel tank, and an electronic control module (ECM) in communication with the engine, the pressure sensor, the temperature sensor, and the fuel sensor. The ECM may be configured to receive, at a first time, first pressure data from the pressure sensor indicating a first pressure within the fuel tank, receive, at the first time, first temperature data from the temperature sensor indicating a first temperature of an environment in which the machine is disposed, receive, at the first time, first fill data from the fuel sensor indicating a first fuel level within the fuel tank, and determine, based at least in part on the first pressure data, the first temperature data, and the first fill data, a predicted pressure rise rate within the fuel tank. The ECM may further be configured to receive, at a second time different from the first time, second pressure data from the pressure sensor indicating a second pressure within the fuel tank, receive, at the second time, second temperature from the temperature sensor indicating a second temperature of the environment, receive, at the second time, second fill data from the fuel sensor indicating a second fuel level within the fuel tank, determine an amount of time between the first time and the second time, determine, based at least in part the predicted pressure rise rate and the amount of time, a predicted pressure within the fuel tank, and generate a notification based at least in part on the predicted pressure, the notification being associated with the fuel tank.

According to a further aspect, a system may include one or more processors and one or more non-transitory computer-readable media storing instructions that, when executed by the one or more processors, cause the one or more processors to perform acts. The acts may include receiving first data indicating a first pressure within a fuel tank of a machine, receiving second data indicating a first fuel level within the fuel tank, receiving third data indicating a second pressure within the fuel tank, and determining, based at least in part on the first pressure and the first fuel level, an expected pressure within the fuel tank. The acts may further include determining a first difference between the first pressure and the second pressure, determining a second difference between the first difference and the expected pressure, and based at least in part on the second difference, causing output of a notification indicating at least one of a first hold time of fuel within the fuel tank or a second hold time of fuel within the fuel tank, the second hold time being less than the first hold time.

According to a further aspect, a fuel system of a machine may include a fuel tank configured to hold fuel, a pressure sensor fluidly connected to the fuel tank, and an electronic control module (ECM) in communication with the pressure sensor. The ECM may be configured to receive information from the pressure sensor, the information indicating: a pressure within the fuel tank at a first time, and a pressure within the fuel tank at a second time. The ECM may further be configured to determine a change in pressure within the fuel tank based on the information, determine a predicted change in pressure within the fuel tank, the predicted change in pressure being associated with the first time and the second time, determine that a difference between the change in pressure and the predicted change in pressure is greater than a threshold, determine, based at least in part on the difference being greater than the threshold, a notification to be displayed, and cause display of the notification.

BRIEF DESCRIPTION OF THE DRAWINGS

The present disclosure is set forth with reference to the accompanying figures. In the figures, the left-most digit(s) of a reference number identifies the figure in which the reference number first appears. The use of the same reference numbers in different figures indicates similar or identical items. Furthermore, the figures may be considered as providing an approximate depiction of the relative sizes of the individual components within individual figures. However, the representations within the figures are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
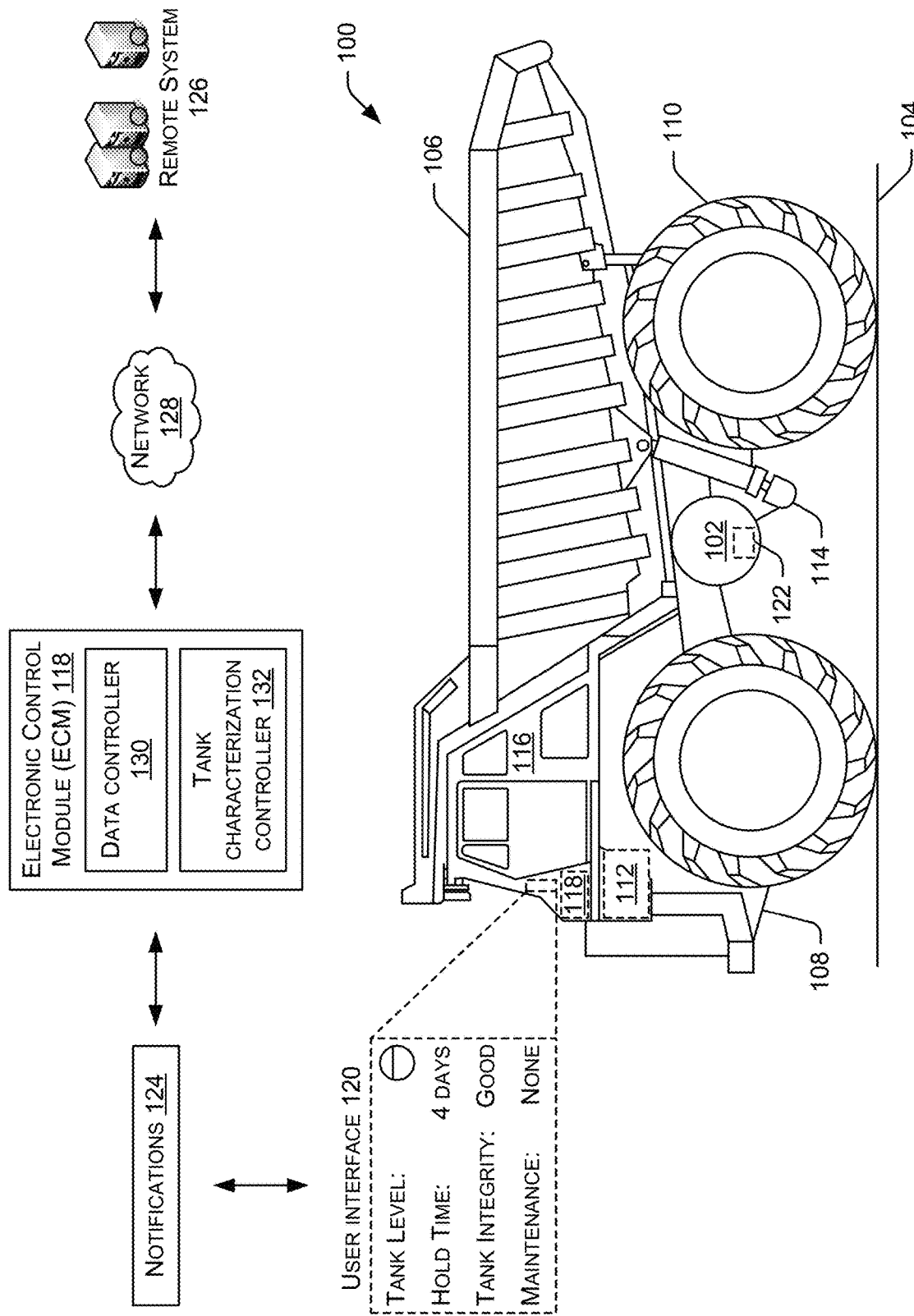
FIG. 1 illustrates an example machine including an example tank and example components for determining a deterioration of the tank, according to an embodiment of the present disclosure.

FIG. 1 is a schematic illustration of an example machine 100 with a tank 102, in accordance with examples of the disclosure. Although the machine 100 is depicted as a type of haul truck, the machine 100 may be any suitable machine, such as any type of loader, dozer, dump truck, skid steer loader, excavator, compaction machine, backhoe, combine, crane, drilling equipment, tank, trencher, tractor, any suitable stationary machine, any variety of generator, locomotive, marine engines, combinations thereof, or the like. Generally, the machine 100 is configured for propulsion using a dual fuel system, such as liquified natural gas (LNG), any other cryogenic fuel such as hydrogen, various hydrocarbons (methane, ethane, propane, butane, pentane, hexane, combinations thereof, or the like), compressed natural gas (CNG), natural gas, LNG mixed with diesel, LNG mixed with gasoline, LNG mixed with kerosene, liquified petroleum gas (LPG), combinations thereof, or the like, as disclosed herein. In some instances, the machine 100 may include a blending kit, or assembly, for combining LNG and diesel, for example, for combing various fuel sources. It should be understood that the dual fuel system (i.e., LNG and diesel), as described herein, are configured for use in a wide variety of machines 100.

The machine 100 is configured, for example, for moving paving materials (e.g., asphalt), mined materials, soil, overburden, heavy construction materials, and/or equipment for road construction, building construction, other mining, paving and/or construction applications. For example, the machine 100 may be used in instances where materials, such as mineral ores, loose stone, gravel, soil, sand, concrete, and/or other materials need to be transported to or from a worksite, or need to be transported between various locations via a surface 104 at the worksite. The machine 100 is configured to carry such materials in, for example, a dump box 106 between such locations at the worksite.

The machine 100 includes a frame 108 and wheels 110. The frame 108 is constructed from any suitable materials, such as iron, steel, aluminum, or other metals. The frame 108 is of a unibody construction in some cases, and in other cases, is constructed by joining two or more separate body pieces. Parts, or components, of the frame 108 are joined by any suitable variety of mechanisms, including, for example, welding, bolts, screws, other fasteners, epoxy, combinations thereof, or the like. The wheels 110 are mechanically coupled to a drive train (not shown) to propel the machine 100. The machine 100 includes an engine 112 that is of any suitable type, size, power output, etc. When the engine 112 is powered, the engine 112 causes the wheels 110 to rotate, via the drive train, to enable the machine 100 to traverse the surface 104. As such, the engine 112 is mechanically coupled to a variety of drive train components, such as a drive shaft and/or axles, to rotate the wheels 110 and propel the machine 100. In some instances, the drive train includes any variety of other components including, but not limited to a differential, connector(s), constant velocity (CV) joints, etc. Although illustrated in FIG. 1 as having a hub with a rubber tire, in other examples, the wheels 110 may be replaced by drums, chain drives, tracks, combinations thereof, or the like.

The engine 112, as described herein, is of any suitable type, such as an internal combustion engine that uses LNG and diesel (or other combustible fluid) as fuel. In some instances, the engine 112 may use mixed fuels, such as, for example, 90% LNG and 10% diesel. The aforementioned mixture is an example, and it should be understood that the fuel mixture may be of any suitable ratio (e.g., 85% LNG and 15% diesel, 95% LNG and 5% diesel, etc.). However, the engine 112 may operate using other fuel mixtures, such as LNG-gasoline mixtures, LNG-kerosene mixtures, etc. Additionally, the engine 112 may operate using other fuels, such as CNG, LPG, other gaseous fuels, other liquid fuels, other cryogenic fuels, etc. LNG, CNG, LPG, or other potential fuels that power the engine 112 may include a variety of gaseous and/or liquid hydrocarbons including, but not limited to, methane, ethane, propane, butane, pentane, hexane, heptane, octane, ethene, propene, isobutene, butadiene, pentene, any suitable alkane, any suitable alkene, any suitable alkyne, any suitable cycloalkane, combinations thereof, or the like.

The engine 112 is powered by providing the engine 112 with fuel, such as LNG or other suitable fuels and/or fuel blends discussed herein, from the tank 102. The tank 102 stores the fuel and/or fuel may be blended for operation of the engine 112. Fuel provided to the engine 112 by the mechanisms described herein. In some examples, the tank 102, particularly for cryogenic fuels (e.g., LNG) may be multi-layered for a relatively high level of thermal insulation. For example, the tank 102 may include a double wall vacuum insulated tank. In such instances, an inner vessel of tank 102 may be wrapped in an insulator and additional insulating properties may be achieved by removing as much air, particles, etc. from a space between in between the two vessels. In some instances, the vacuum is pulled to near absolute zero.

In some instances, the tank 102 may represent a tank for the LNG. In such instances, the machine 100 may include additional tanks for diesel, or other fuel sources. As such, the machine 100 may include a plurality of tanks for storing fuel sources to propel and power the machine 100. In such instances, the engine 112 is powered via the plurality of tanks carried by the machine 100.

As noted above, the machine 100 includes the dump box 106 or other moveable elements configured to move, lift, carry, and/or dump materials. The dump box 106 is actuated by one or more hydraulic system 114, or any other suitable mechanical system. In some instances, the hydraulic system 114 is powered by the engine 112, such as by powering hydraulic pump(s) (not shown) of the hydraulic system 114. However, it should be noted that in other types of machines (e.g., machines other than a mining truck) the hydraulic system 114 may be in a different configuration than the one shown in FIG. 1, may be used to operate elements other than a dump box 106, and/or may be omitted.

The machine 100 also includes a cabin or other operator station 116. The operator station 116 is configured to seat an operator (not shown) therein. The operator seated in the operator station 116 interacts with various control interfaces and/or actuators (e.g., steering wheel, levers, joysticks, etc.) within the operator station 116 to control movement of the machine 100 and/or various components of the machine 100, such as raising and lowering the dump box 106. However, in some instances, the machine 100 may be remotely controlled.

An electronic control module (ECM) 118 of the machine 100 receives operator signal(s), such as an accelerator signal, based at least in part on the operator's interactions with one or more control interfaces and/or actuators of the machine 100. The ECM 118 uses the operator signal(s) to generate command signals to control various components of the machine 100. The operator station 116 may also include a user interface (UI) 120 to control one or more components of the 100, such as the hydraulic system 114 to control the movement of the dump box 106. The UI 120 may include a touch-sensitive interface, display panel (e.g., LCD, LED, etc.). However, other control interfaces and/or actuators within the operator station 116 may allow for the control of the hydraulic systems 114 or other components of the machine 100. In such instances, the ECM 118 may receive operator signal(s) and use the operator signals to generate various command signals or instructions to control various components of the machine 100. The machine 100 further includes any number of other components within the operator station 116 and/or at one or more other locations on the frame 108. These components may include, for example, one or more of a location sensor (e.g., global positioning system (GPS)), an air conditioning system, a heating system, communications systems (e.g., radio, Wi-Fi connections), collision avoidance systems, cameras, etc. These components and/or systems are powered by any suitable mechanism, such as by using a direct current (DC) power supply powered by the engine 112 along with a generator (not shown) and/or inverter (not shown), an alternating current (AC) power supply powered by the engine 112 and a generator, and/or by mechanical coupling to the engine 112. The ECM 118 may communicatively couple to the components and/or systems for controlling their operation.

Additionally, the ECM 118 may communicatively couple to sensor(s) 122 of the machine 100. The sensor(s) 122, by way of example, may include temperature sensor(s) (e.g., engine temperature, transmission temperature, coolant temperature, ambient temperature, etc.), pressure sensor(s) (e.g., tank pressure, tire pressure, etc.), tank level sensor(s) (e.g., fill level, fuel level, etc.), and so forth. The ECM 118 may receive various signals from the sensor(s) 122 for controlling an operation of the machine 100 and/or outputting alerts, indications, or other notifications 124 to the operator.

For example, if the pressure of the tank 102 is greater than a certain threshold, the ECM 118 may generate a notification 124 comprising a corresponding alert, indication, or other information. In such examples, and as illustrated schematically in FIG. 1, the ECM 118 may cause the notification 124 to be output on the UI 120 within the operator station 116. By way of another example, the ECM 118 may receive an signal from a sensor 122 indicative of a fill event at the tank 102 for use in determining current levels of fuel in the tank 102. The ECM 118 may also receive signals from sensors 122 indicative of when the machine 100 is moving on the surface 104 (e.g., accelerator), when the machine 100 is turned on and off (e.g., ignition switch), and so forth. In such additional examples, the ECM 118 may generate one or more notifications 124 corresponding to and/or including the received information, and may cause one or more such notifications 124 to be output by the UI 120. Additionally or alternatively, the ECM 118 may provide any of the notifications 124 described herein to a remote system 126 via a network 128. As discussed herein, the notifications 124 may trigger various actions, commands, or events associated with the machine 100 and/or the tank 102 (e.g., schedule maintenance, etc.).

The ECM 118 may include a data controller 130 for receiving data from the sensor(s) 122. For example, the data controller 130 may receive pressure data, temperature data, and/or fuel level data from one or more of the sensors 122. The data controller 130 may process the data for use by the ECM 118 in generating and/or determining the notifications 124 to output. The ECM 118 is further shown including a tank characterization controller 132 that generates and/or determines the notifications 124 to output on the UI 120. In some instances, the tank characterization controller 132 may utilize the pressure data, temperature data, and fuel level data, as processed by the data controller 130, to generate the notifications 124 described herein.

For example, the UI 120 is shown including indications associated with a tank level, hold time, tank integrity, and/or maintenance. The tank level may indicate a volume of LNG within the tank 102, and the hold time may represent an amount of time that the tank 102 may hold the fuel in the tank 102 before a relief valve is opened. In such examples, the hold time may be indicative of the insulating properties of the tank 102. In some instances, and as discussed herein, the ECM 118 may determine the hold time by correlating pressure, tank level, and/or temperature with an associated predicted hold time. In other words, based at least in part on the pressure within the tank 102, the volume of LNG in the tank 102, and/or the ambient temperature, the ECM 118 may determine a corresponding hold time associated with the tank 102 under the specified conditions. Based on the hold time, the tank 102 may have an associated integrity. Furthermore, whether maintenance is recommended may be based on the hold time and/or the tank integrity. The integrity rating may be determined using lookup tables, a map, an algorithm, or other processes. For instance, the ECM 118 may compare the determined hold time against a plurality of thresholds/threshold ranges corresponding to respective integrity ratings. For example, if the hold time is less than a first threshold (e.g., one day), the tank 102 may include a low hold time and/or tank integrity. Tanks 102 having a low hold time and/or poor tank integrity may result in increased fuel costs and/or carbon emissions (e.g., as a result of the relief valve 238 opening and boiling off fuel). If the hold time is greater than the first threshold, but less than a second threshold (e.g., three days), the tank 102 may include a medium hold time. Additionally, if the hold time is greater than the second threshold, but less than a third threshold (e.g., five days), the tank 102 may have a high hold time. As such, the hold time may indicate whether maintenance should be performed on the tank 102 and/or that the tank 102 should be replace or serviced by re-establishing the vacuum through a pump down process. The hold time may also be indicative of the integrity of the tank 102. For example, if the hold time is low, the tank may include a poor integrity, whereas if the hold time is high, the tank 102 may have good integrity.

The tank characterization controller 132 may utilize the determined hold time and/or integrity for characterizing the tank 102. In such examples, the tank characterization controller 132 may generate and/or output a corresponding notifications 124 indicating such information.

In some instances, the machine 100 may communicatively couple to a remote computing device or a remote system 126. For example, the machine 100, the ECM 118, or other components of the machine 100 may cause signals generated by the sensor(s) 122, the notifications 124, and/or other data to be sent to the remote system 126.

The remote system 126 may be located in an environment of the machine 100 (e.g., at the worksite) and/or may be located remotely from the environment. In any of the examples described herein, the functionality of the ECM 118 may be distributed so that certain operations are performed by the machine 100 and other operations are performed by the remote system 126. For example, the operations for outputting the notifications 124 on the UI 120 may be sent by the remote system 126 to the machine 100. In such instances, the machine 100 (or another intermediary device) may be configured to transmit signals from the sensor(s) 122, for example, to the remote system 126 for outputting the notifications 124. Accordingly, the remote system 126 may control operations of the machine 100 and/or determine pressures associated with tank 102 for outputting certain notifications 124.

In some instances, the remote system 126 may be in communication with the machine 100 via a network 128. The network 128 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 128.

As such, the ECM 118 of the machine 100 may receive sensor data from sensor(s) 122 of the machine 100 for use in determining an integrity of the tank 102. The data controller 130, of the ECM 118, for example, may receive the sensor data and/or process the sensor data for use in determining the integrity. Therein, the tank characterization controller 132 may determine a characterization of the tank 102, which may be used for outputting certain notifications 124 to the operator. However, any of these operations may be performed by the remote system 126, and communicated back to the machine 100 for outputting the notifications 124. As such, operators of the machine 100 may be proactive about maintenance of the machine 100 to increase productivity, downtime, and/or damage to components of the machine 100.

Figure 2:
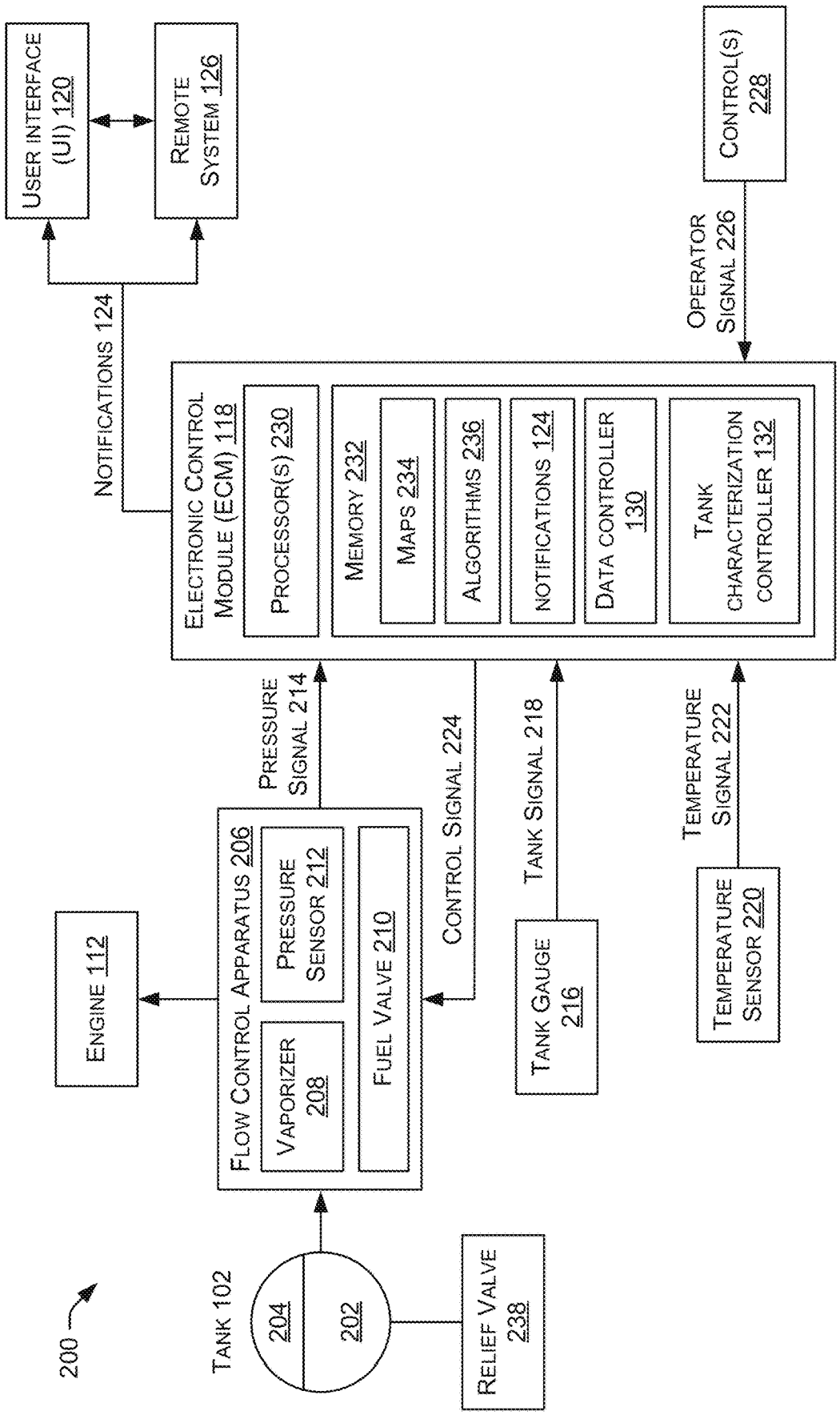
FIG. 2 illustrates an example schematic of an example fuel delivery system of the machine of FIG. 1, and components for determining the deterioration of the tank, according to an embodiment of the present disclosure.

FIG. 2 is a schematic illustration of a fuel delivery system 200 of the machine 100 depicted in FIG. 1. The tank 102 is configured to hold or store LNG, an LNG blend, and/or any other suitable fuel. The tank 102 may include a first compartment 202 having LNG and a second compartment 204 having natural gas, also referred to as LNG vapor, head space vapor, boiled-off gas, and/or gas. The LNG within the first compartment 202 may represent saturated LNG, or fuel in which the LNG and the natural gas are in equilibrium. In some instances, the natural gas within the second compartment 204 may be generated via the LNG heating from an environment of the machine 100.

The tank 102 is fluidly connected to a flow control apparatus 206. Fuel, such as the LNG or the natural gas may be provided to the flow control apparatus 206. As shown, the flow control apparatus 206 may include a vaporizer 208 (e.g., heat exchanger), a fuel valve 210, and/or a pressure sensor 212. The vaporizer 208 allows the LNG from first compartment 202 of the tank 102 to be in gaseous form (e.g., natural gas) and provided to the engine 112. In some instances, the vaporizer 208 may heat or warm the LNG using liquid (e.g., water) heated from the engine 112. Thus, the vaporizer 208 brings the fuel to a temperature and/or pressure that is suitable for the fuel to be in gas phase. In some instances, the vaporizer 208 heats the LNG received from the tank 102. Across the vaporizer 208, the temperatures of the LNG may increase but the pressure may substantially remain the same (e.g., constant pressure). Additionally, or alternatively, the vaporizer 208 allows the LNG to expand (e.g., go through a phase change from liquid to gas). Still, in some instances, the vaporizer 208 allows for both heating and expansion of the LNG. Regardless, fuel exits the vaporizer 208 in a state that is appropriate and/or optimized for consumption by the engine 112.

The fuel valve 210 may vary the amount of fuel supplied to the engine 112. For example, when an accelerator, such as a pedal (not shown) is actuated (e.g., pressed with a foot) by an operator of the machine 100 to indicate a desired movement of the machine 100, the ECM 118 may generate and transmit an associated control signal 224. These control signals 224 may be generated in response to operator signals 226 received from various control(s) 228 of the machine 100. In other words, the accelerator may represent a control 228 of the machine 100 that generates the operator signal 226 sent to the ECM 118. The operator signal 226 may indicate the magnitude of the desired movement of the machine 100 and when received by the ECM 118, the ECM 118 controls various aspects of the fuel delivery system 200 to provide fuel from the tank 102 to the engine 112. For example, the control signal 224 sent to the flow control apparatus 206 may indicate a flow rate of fuel to supply to the engine 112. In response, the flow control apparatus 206 may actuate or open the fuel valve 210 by various amounts or to varying degrees.

In some instances, the pressure sensor 212 is configured to measure the pressure of the fuel being provided to the vaporizer 208. Additionally, or alternatively, the pressure sensor 212 is configured to measure the pressure of the fuel downstream of the vaporizer 208 and upstream of the fuel valve 210. The pressure sensor 212 may also be located upstream of intake manifolds, regulators, or other components of the flow control apparatus 206 prior to entering the engine 112. However, the pressure sensor 212, or a group of pressure sensors 212, may measure the pressure both upstream and downstream of the vaporizer 208. The pressure sensor 212 is configured to generate and send a pressure signal 214 to the ECM 118.

The fuel delivery system 200 further includes a tank gauge 216. The tank gauge 216 may measure an amount of the LNG within the tank 102, or within the first compartment 202 (e.g., fill level, fill volume, etc.). For example, the tank gauge 216 may represent a capacitive sensor that measures a dielectric constant of the fuel within the tank. Being as the dielectric constant of the LNG is closely related to density, the dielectric constant may be used for measuring a volume of the LNG within the tank 102. As shown, the tank gauge 216 is configured to generate and send a tank signal 218 to the ECM 118, where the tank signal 218 is indicative of the fuel level of the LNG within the tank 102, or within the first compartment 202.

The fuel delivery system 200 may further include a temperature sensor 220. The temperature sensor 220 may be disposed on or about various parts of the machine 100, such as outside the operator station 116. The temperature sensor 220 may measure an ambient temperature of an environment of the machine 100. The temperature sensor 220 is configured to generate and send a temperature signal 222 to the ECM 118.

In some instances, the pressure sensor 212, the tank gauge 216, and/or the temperature sensor 220 may respectively generate and transmit signals according to predetermined schedules. For example, the pressure sensor 212, the tank gauge 216, and/or the temperature sensor 220 may transmit pressure, tank levels, and/or temperatures, respectively, to the ECM 118 every second, minute, etc. Moreover, in some instances, and as discussed herein, the pressure sensor 212, the tank gauge 216, and/or the temperature sensor 220 may transmit signals to the ECM 118 based on certain triggering events, operating conditions, or operator signals 226 received by the ECM 118. In some instances, the triggering events may be associated with on/off events of the machine 100, when the machine is stationary (i.e., not moving), and so forth. For example, when the machine 100 is turned off, the ECM 118 may receive an operator signal 226 (from an ignition mechanism) and in response, the ECM 118 may receive the pressure signal 214, the tank signal 218, and/or the temperature signal 222. In some instances, the ECM 118 may receive the pressure signal 214, the tank signal 218, and/or the temperature signal 222 in response to the ECM 118 transmitting an instruction or request to the pressure sensor 212, the tank gauge 216, and/or the temperature sensor 220, respectively, for obtaining the signals. In some instances, the pressure sensor 212, the tank gauge 216, and/or the temperature sensor 220 may be referred to as the sensor(s) 122, as introduced above with regard to FIG. 1.

In some instances, the pressure signal 214, the tank signal 218, and/or the temperature signal 222 may be received at a time commensurate with the machine 100 powering down, or a time just prior or immediately before the machine 100 powers down (e.g., one second, two seconds, etc.). In other words, if the operator signal 226 is indicative of the operator powering down the machine 100, in response, the pressure sensor 212 may supply the pressure signal 214 to the ECM 118, the tank gauge 216 may supply the tank signal 218 to the ECM 118, and the temperature sensor 220 may supply the temperature signal 222 to the ECM 118. In some instances, as part of powering down, the ECM 118 may receive the pressure signal 214, the tank signal 218, and/or the temperature signal 222. Noted above, the signals, or the data associated with the signals, may indicate measurements commensurate in time with the machine 100 powering down (or the operator signal 226) or just prior to the machine 100 powering down.

As shown, the fuel delivery system 200 may include a relief valve 238 fluidly connected to the tank 102. The relief valve 238 may open based on a certain pressure within the tank 102 or the pressure exceeding a certain threshold. In some instances, the fuel delivery system 200 may include more than one relief valve 238. The relief valve 238 may prevent damage to the machine 100 and/or explosion resulting from a pressure increase within the tank 102. For example, when the machine 100 is not in use, the pressure within the tank 102 may increase with the temperature of the environment and the boiling of the LNG. As such it is expected that the pressure increases by some given amount due to the ambient temperature of the environment in which the machine 100 and/or other environmental conditions.

Upon the machine 100 powering up, the ECM 118 may receive an operator signal 226. In response, the ECM 118 may receive the pressure signal 214, the tank signal 218, and/or the temperature signal 222. The pressure signal 214 may indicate a pressure within the tank 102 after powering up, or as part of a powering up procedure and commensurate with the machine 100 powering up. The tank signal 218 may indicate a level of LNG within the tank 102 after powering up, or as part of a powering up procedure and commensurate with the machine 100 powering up. In some instances, the pressure signal may represent a pressure of the fuel line downstream of the vaporizer 208 but upstream of the engine 112. The pressure at this location may indicate the pressure within the tank 102.

In some instances, the ECM 118 may determine a health, deterioration, or integrity of the tank 102 based at least in part on the pressure signal(s) 214, the tank signal(s) 218, and/or the temperature signal(s) 222 between the machine 100 powering up and powering down. In some instances, the health, deterioration, and/or integrity of the tank 102 may be associated with a vacuum and/or insulating properties of the tank 102. For example, as a vacuum within the tank 102 deteriorates, insulating properties of the tank 102 decline and more heat may be added to the fuel. As a result, pressure within the tank 102 may increase, which in turn, may cause the relief valve 238 to open and exhaust the natural gas. More generally, the ECM 118 may characterize the health or integrity of the tank 102 based on the measured pressure.

In some instances, the health or the integrity of the tank 102 may be associated with the vacuum properties of the tank 102 and/or the physical structural integrity of the tank 102. For example, within the tank 102, the vacuum integrity will naturally deteriorate over time as particles permeate through walls of the tank 102 (e.g., O-rings, seams, etc.). In these instances, a vacuum pump may be attached to the tank and the vacuum can be re-established. A physical structural integrity of the tank 102 may be associated with microcrack, visible cracks, frosting, cracks may also occur on the inner vessel of the tank 102 which is not possible to see without tank dissection. Regardless, in either situation, the integrity of the tank 102 may be compromised given a different in measured and expected pressure.

To determine the deterioration of the tank 102, the ECM 118 is shown including processor(s) 230 and memory 232, where the processor(s) 230 may perform various functions and operations associated with determining the integrity of the tank 102 and the memory 232 may store instructions executable by the processor(s) 230 to perform the operations described herein. Additionally, the ECM 118 may include the data controller 130 for receiving data from the fuel valve 210, the pressure sensor 212, the tank gauge 216, and/or the temperature sensor 220. For example, in response to receiving the pressure signal 214, the tank signal 218, and the temperature signal 222 when the machine 100 powers up, the ECM 118 may determine a predicted hold time. The predicted hold time may represent an amount of time at which the tank 102 may hold the fuel in the tank 102 before the relief valve 238 is opened. How long the tank 102 is able to hold the fuel may indicate the insulating properties of the tank 102.

The ECM 118 may determine the predicted hold time, for example, using one or more maps 234 and/or algorithms 236 stored in the memory 232 and/or which are otherwise accessible by the ECM 118. In some instances, the maps 234 may map or correlate pressure, tank level, and/or temperature with an associated predicted hold time. In other words, based at least in part on the pressure within the tank 102, the volume of LNG in the tank 102, and/or the ambient temperature, the tank 102 may have a specified hold time. These hold times may be mapped and correlated with one another. In some instances, the ECM 118 may utilize the algorithms 236 for determining the hold time and by accessing the maps 234 to correlate the pressure, tank level, and/or temperature with the hold time. For example, algorithms 236 may accept, as an input, the pressure of the fuel, a fuel level, and/or temperature and determine an associated hold time of the tank 102 using the maps 234. Additionally, the algorithms 236, based on the hold time, may determine an amount of pressure increase within the tank 102 per second, minute, hour, day, and so forth. In other words, the algorithms 236 may correlate the hold time with a pressure rise rate in the tank 102. For example, if the ECM 118 determines, based on the maps 234, that the hold time of the fuel is five days, the algorithms 236 may determine an expected pressure rise rate of the fuel within the tank 102 per second, minute, etc. As a brief example, if the pressure rise between key off and key on over a period of 4 hours is 15 psi, while the fuel level is at 50%, and the average ambient temperature is 80° F., the algorithms 236 may determine that the hold time characteristics of the tank is three days which would be considered a healthy tank. This amount of time may be indicated per day, per hour, per minute, and so forth.

The expected hold time and/or the expected pressure rise within the tank 102 may be compared against actual measured values. For example, upon the machine 100 powering up, the ECM 118 may receive an operator signal 226. In response, noted above, the ECM 118 may receive the pressure signal 214, the tank signal 218, and/or the temperature signal 222. The pressure signal 214 may indicate a pressure within the tank 102 after to powering up, or as part of a powering up procedure and commensurate with the machine 100 powering up. The tank signal 218 may indicate a level of LNG within the tank 102 after to powering up, or as part of a powering up procedure and commensurate with the machine 100 powering up. In other words, the ECM 118 may determine an actual pressure within the tank 102 upon the machine powering up.

Using the algorithms 236, the ECM 118 may determine a predicted tank pressure upon the machine 100 powering on. For example, knowing the amount of time between the machine powering down and the machine 100 powering up, the ECM 118 may determine a predicted (or expected) tank pressure. That is, using the amount of time between a "key-off" event and a "key-on" event, the ECM 118 may determine an expected pressure within the tank 102. This expected pressure may be compared against the actual pressure measured when the machine 100 turned on. That is, knowing the actual change in pressure between the key-off event and the key on-event, as well as the predicted (or expected) pressure, allows for a difference to be calculated. This difference may indicate whether the predicted pressure was accurate or inaccurate. If accurate, this may indicate that the pressure was accurately predicted and that the tank 102 is properly insulated. However, if inaccurate, this may indicate that the tank 102 is not properly insulated and had a pressure rise greater than expected. Such determination may indicate a deterioration of the tank 102. By way of brief example, if the predicted tank pressure is 150 psi, and the measured tank pressure is 250 psi, this may indicate that the tank 102 is not properly insulated and had a pressure rise greater than expected. Here, the tank characterization controller 132 may characterize the tank (e.g., poor, fair, bad, etc.) for causing certain notifications to be output. The notifications may be based on the characterization of the tank 102, or the severity of the difference between the expected pressure rise and the actual pressure rise. Larger deviations (e.g., those above a threshold) may indicate that the tank 102 is performing differently than expected, whereas smaller deviations may indicate that the tank 102 is performing as expected. In the former instance, maintenance of the tank 102 may be of more immediate concern.

The "key-off" event noted above may refer to an action or other event in which an operator turns a key of the machine 100 to power down one or more components of the machine 100. The key-off event may indicate when the machine 100 is powered down and/or if the engine 112 is powered down while other components of the machine are still operational. In such instances, the ECM 118 may receive an indication of the key-off event and may identify that the machine 100 is in a key-off state. In some cases, a key-off state may be associated with the machine 100 is not moving. Similar to the key-off event, the "key-on" event noted above may refer to an action or other event in which one or more components of the machine 100 is powered up. Again, the ECM 118 may receive an indication of the key-on event and may identify that the machine 100 is in a key-on state. In some instances, the ECM 118 is configured to identify that the engine 112 has been powered up, such as by an operator turning the key to the on position.

In some instances, the difference between the actual pressure and the expected pressure may be compared against one or more thresholds. For example, a slight deviation (e.g., +/−5 psi, +/−10 psi, +/−10% difference, etc.) in the actual pressure or the expected pressure may be acceptable or if within a certain range. However, larger deviations (e.g., +/−50 psi, +/−100 psi, +/−100% difference, etc.) may be a cause of concern and indicate that the integrity of the tank 102 is deteriorating. The integrity of the tank 102 may be attributable to hold times of the tank 102, or the amount of time the tank 102 may hold fuel without opening the release valve 238. As such, by comparison of the pressure difference to thresholds, the tank 102 may be characterized for determining the remaining life of the tank 102, or whether the tank 102 has a hold time less than a certain amount of time. Multiple thresholds may be used for comparison to classify the integrity of the tank 102.

Based on the integrity of the tank 102, the ECM 118 may output the notifications 124. The notifications 124 may indicate the insulating properties of the tank 102, the hold time of the tank 102, a health of the tank 102 (e.g., good, poor, fair, etc.), maintenance or service of the tank 102 (e.g., replace vacuum plug), a remaining lifespan of the tank 102, a severity of the deterioration (e.g., acceptable, schedule for service, loss of vacuum integrity, etc.). In some instances, the notifications 124 may be output on the UI 120 for allowing the operator to take one or more action(s) (e.g., schedule service). Additionally, or alternatively, the notifications 124 may be sent to the remote system 126 for further analysis.

To illustrate and by way of example, at a first time, and in response to a first operating condition, the ECM 118 may record a tank pressure based at least in part on the pressure signal 214 and tank level based at least in part on the tank signal 218. For example, the ECM 118 may record a pressure level based at least in part on the pressure signal 214 and a tank level based at least in part on the tank signal 218, at a key-off event of the machine 100. The ECM 118 may also record, at the first time, a temperature based at least in part on the temperature signal 222. The ECM 118 may again record, at a subsequent second time, and in response to a second operating condition, the tank pressure based at least in part on the pressure signal 214 and the tank level based at least in part on the tank signal 218. For example, the ECM 118 again records a pressure level based at least in part on the pressure signal 214 and a tank level based at least in part on the tank signal 218, at a subsequent key-on event of the machine 100.

Using the maps 234 and/or the algorithms 236, the ECM 118 may determine an expected change in pressure between the first time and the second time (e.g., between the key-off event and the key-on event). If the change in pressure between the first time and the second time is different from what is expected (e.g., by comparison to one or more thresholds), this may indicate that an integrity of the tank 102 is deteriorating. For example, the expected pressure may be 150 psi, but the actual pressure may be 200 psi. In some instances, the 50 psi difference may be indicative of the deterioration above the normal allowable threshold which will indicate a level of concern with the tank integrity. The ECM 118 may characterize the integrity of the tank 102 based on a difference between the expected pressure and the actual pressure and/or by comparison to multiple thresholds. The characterizations of the tank 102 may be associated with respective notifications 124 that are output to the operator. That is, based on the thresholds being met or exceeded, certain notifications may be output whereby the notifications are associated with the integrity of the tank 102 and/or the remaining life of the tank 102.

In some instances, initially, the ECM 118 may determine whether a filling event has occurred during any two points in time, such as between the key-off event and the key-on event. For example, the ECM 118 may compare the tank level recorded at the first time with the tank level at the second time. The comparison of the tank level may indicate whether the tank 102 was refilled with LNG. For example, if the tank level was at 50% at the key-off event, and 90% at the key-on event, this may indicate that the tank 102 was refilled. The occurrence of a fill event determines if the data is used for tank integrity calculations.

As used herein, a processor, such as the processor(s) 230 may include multiple processors and/or a processor having multiple cores. Further, the processor(s) 230 may comprise one or more cores of different types. For example, the processor(s) may include application processor units, graphic processing units, and so forth. In one implementation, the processor(s) 230 may comprise a microcontroller and/or a microprocessor. The processor(s) 230 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 232 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The fuel delivery system 200 may therefore include components for measuring pressure within the tank 102, fuel levels within the tank 102, and temperatures of an environment of the machine 100. The ECM 118 may use this information for determining a health of the tank 102, through inputting data into the maps 234 and/or algorithms 236. Based on determinations by the ECM 118, and the health of the tank 102, the ECM 118 may cause notifications to be output (e.g., on a display device of the machine 100).

Figure 3:
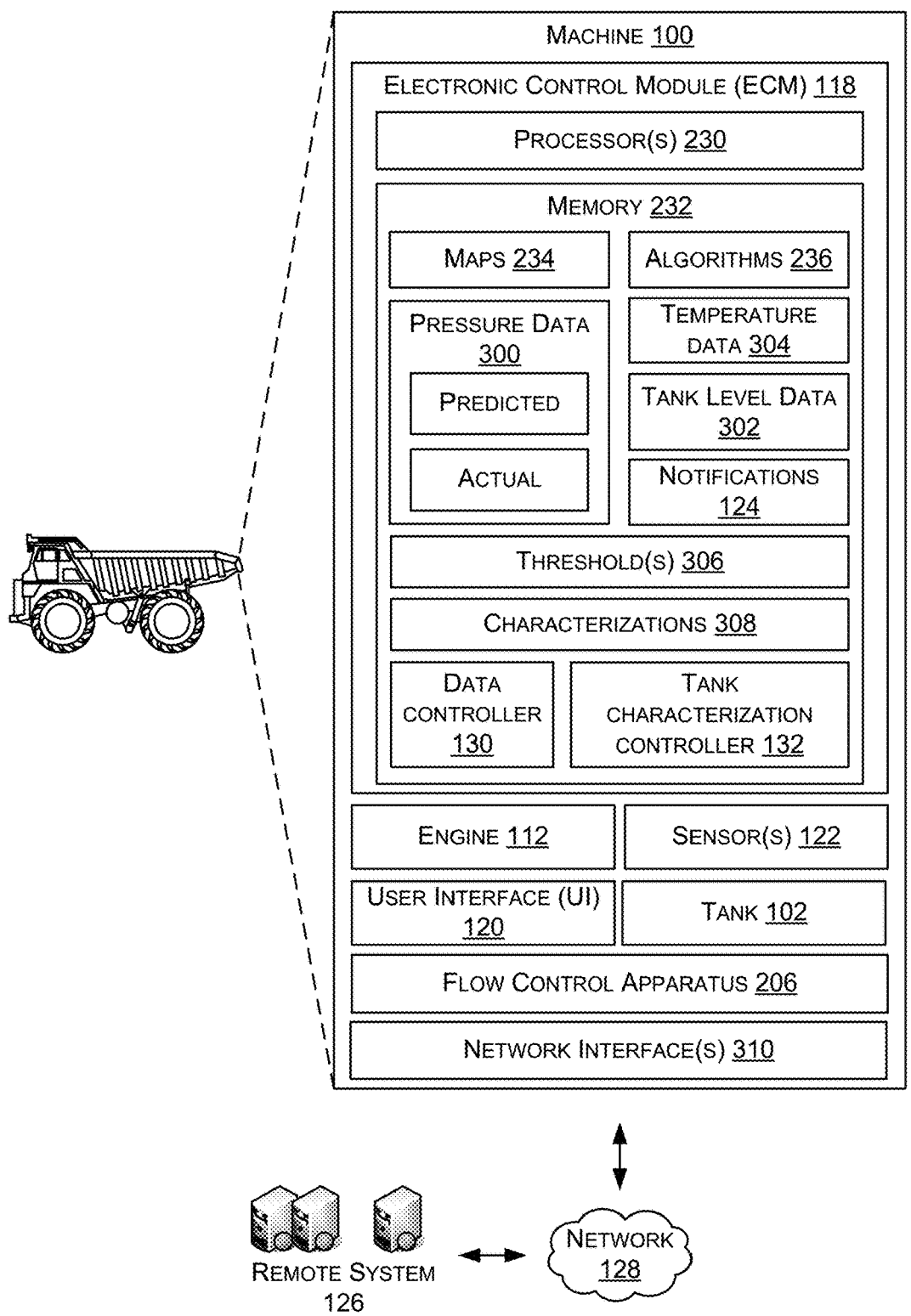
FIG. 3 illustrates example components of the machine of FIG. 1, according to an embodiment of the present disclosure.

FIG. 3 is a block diagram of the ECM 118 that may determine the integrity, deterioration, and/or insulating properties of the tank 102. Compared to FIG. 2, FIG. 3 may represent a detailed component diagram of the ECM 118 and the component(s) utilized to determine the integrity of the tank 102.

As introduced above, the machine 100 may include the engine 112 for powering the machine 100 as well as various components of the machine 100 (e.g., hydraulics, drive mechanisms, etc.). The machine 100 further includes the tank 102 for holding fuel that powers the machine 100, such as the engine 112, the sensor(s) 122 that measure operating conditions of the machine 100. The sensor(s) 122, in some instances, may correspond to the pressure sensor 212, the tank gauge 216, and/or the temperature sensor 220 as introduced above with the fuel delivery system 200. The tank 102 also fluidly connects to the flow control apparatus 206 for delivering fuel to the engine 112.

The ECM 118 is shown including the processor(s) 230 and the memory 232. The ECM 118 is configured to receive pressure data 300, tank level data 302 (e.g., fuel level data), and/or temperature data 304 from the sensor(s) 122. In some instances, the ECM 118 may receive the pressure data 300, the tank level data 302, and/or temperature data 304 according to a predetermined schedule and/or in response to certain operating conditions of the machine 100. In some instances, the operating conditions may be key-off and/or key-on events of the machine 100. The ECM 118 may include the data controller 130 for receiving and/or processing the pressure data 300, the tank level data 302, and/or temperature data 304.

The maps 234 may associate a given pressure, tank level, and/or temperature with an expected increase in pressure within the tank 102. For example, at a key-off event, the measured pressure, tank level, and/or temperature may be used to determine a predicted rise in pressure over a certain time interval. At a key-on event, the pressure, tank level, and/or temperature may again be recorded. Additionally, a time interval between the key-off event and the key-on event may be determined. The time interval may be used to determine a predicted pressure within the tank 102. That is, knowing the predicted pressure rise (i.e., rate) and the amount of time the machine 100 was powered down, the ECM 118 may determine a predicted pressure. The ECM 118 is configured to identify pressure, time, and/or temperature differentials between a first time and a subsequent second time. For example, the ECM 118 is configured to identify pressure, time, and/or temperature differentials between the key-off and key-on events based at least in part on the sensor(s) 122 providing signal(s) or data to the ECM 118.

In some instances, the predicted pressure may be determined using the algorithms 236. In some instances, the algorithms 236 may use any suitable input(s), such as pressure, time between the key-off and key-on events, temperature at key-off event, temperature at key-on event, difference in temperature from key-off to key-on events, combinations thereof, or the like. The maps 234 and/or the algorithms 236 may be generated by training any suitable type of model by correlating pressure, temperature, and/or a tank level. By way of non-limiting examples, these pressure models are of any suitable type, such as any variety of look-up table, fitting function, machine learning, and/or artificial intelligence models, such as neural network models. Other example machine learning model(s) that are generated and used as the one or more pressure model(s) include linear regression models, decision tree models, random forest models, Bayesian network models, any variety of heuristics (e.g., genetic algorithms, swarm algorithms, etc.), combinations thereof, or the like. In some examples, the algorithms 236 are a combination of different machine learning models.

To illustrate the use of the maps 234 and the algorithms 236, the ECM 118 may receive, at a first time and in response to a key-off event, pressure data 300, tank level data 302, and/or temperature data 304. At a second time that is after the first time, the ECM 118 may receive in response to a key-on event, pressure data 300, tank level data 302, and/or temperature data 304. The ECM 118 may determine an amount of time between the first time and the second time, as well as differences between the pressure data 300, the tank level data 302, and/or the temperature data 304 measured at the first time and the second time, respectively.

The ECM 118 may determine whether a fill event occurred by comparing the tank level data 302 and the first time with the tank level data 302 at the second time. For example, if the tank level data 302 at the first time indicated a fuel level of 50% (i.e., 50% LNG), and subsequently, at the second time, the tank level data 302 indicates a fuel level of 50%, or substantially 50%, the ECM 118 may determine that a fill even did not occur. In some instances, if the fuel levels between the first time and the second time are substantially similar (e.g., within 1%), the ECM 118 may determine that a fill event did not occur.

Subsequently, using the maps 234, the algorithms 236, and an amount of time between the first time and the second time, the ECM 118 may determine an expected pressure rise. As shown, the pressure data 300 may store actual pressure (i.e., the actual pressure measured at the first time and the second time) as well as the predicted pressure. For example, knowing the amount of time elapsing between the first time and the second time, the ECM 118 may determine an expected pressure in the tank 102 at the second time using the maps 234 and/or the algorithms 236.

Comparison of the actual pressure at the second time and the expected pressure may yield a certain difference. This difference may be indicative of whether the predicted pressure was accurate or inaccurate. For example, if the pressure rise in the tank 102 is less than the predicted pressure, this may indicate that that the tank 102 is properly insulated. Alternatively, if the pressure rise in the tank 102 is greater than the predicted pressure, this may indicate that that the tank 102 not properly insulated. To aid in this determination, the ECM 118 may compare the difference between the pressure and the predicted pressure to one or more thresholds 306.

In some instances, the thresholds 306 may include one, two, three, etc. thresholds that the difference between the actual pressure and the actual pressure is compared against. The thresholds 306 may be determined using ratings of the tank 102 and/or manufacturer specifications of the tank 102. Alternatively, the threshold 306 may be determined based on the predicted pressure increase. For example, if the predicted pressure increase between the first time as the second time is 25 psi, the thresholds 306 may be set at 30 psi (e.g., 120%), 40 psi (e.g., 160%), and 50 psi (e.g., 200%). In other words, the thresholds 306 may be determined based on a certain factor, or percentage, of the predicted pressure. In other instances, the thresholds 306 may be determined based on certain safety considerations.

The thresholds 306 may each be associated with certain characterization 308 of the tank 102. The characterizations 308, for example, may indicate a severity index of the vacuum within the tank 102 (e.g., acceptable, schedule for service, loss of vacuum integrity), a remaining life of the tank 102 (e.g., one month, one year, etc.), a hold time of the fuel within the tank 102, and/or a general health of the tank 102 indicative of the insulating properties. For example, as a vacuum of the tank 102 deteriorates, insulating properties decline, and more heat is added to the LNG. As a result, the LNG within the first compartment 202 may boil and cause an increase in vapor pressure. As vapor pressure increases, the relief valve 238 of the tank 102 may open. In some instances, the hold time of the tank 102 may be associated with an amount of time before the relief valve 238 is opened. In some instances, the tank characterization controller 132 may determine an associated characterization 308 of the tank 102 based on the comparison of the difference between the pressure and the predicted pressure to one or more thresholds 306.

The health of the tank 102 may therefore be correlated with the hold time. For example, tanks 102 with low hold times (e.g., one day) may have undesirable insulating properties whereas tanks 102 with longer hold times (e.g., five days) may have desirable insulating properties. For example, low hold times may result in fuel boiling off, which in turn, may increase fuel expenses and increase carbon emissions. Between these two spectrums, however, the tanks 102 may be characterized by various hold times. Moreover, in some instances, each of the hold times may be associated with a respective characterization 308. For example, if the hold time is one day, the characterization 308 of the tank 102 may be "poor," whereas if the hold time is five days, the characterization 308 of the tank 102 may be "great." As noted above, the characterizations 308 may be determined utilizing the maps 234 and/or algorithms 236 to understand the effects of temperature, pressure, and/or tank level on the hold time. Moreover, although the characterizations 308 are discussed as being associated with a hold time, the characterizations 308 may be associated with a pressure rise rate, or increase in pressure, per given period of time.

Based on the characterizations 308, the ECM 118 may output a respective notification 124. For example, the notifications 124 may be associated with a health or integrity of the tank 102. The notifications 124, in some instances, may be audible and/or visual and may be output on the UI 120 within the operator station 116. Such notifications 124 may serve to inform the operator of actions to undertake to repair or service the machine 100, or the tank 102. As such, the characterization 308 of the tank 102 may cause an associated notification 124 to be transmitted or displayed to the operator (e.g., via the UI 120, display device, etc.).

The machine 100 may communicatively couple to the remote system 126. In some instances, the remote system 126 may perform any of the operations performed by the ECM 118 for determining the integrity of the tank 102. In some instances, the remote system 126 may be implemented as one or more servers and may, in some instances, form a portion of a network-accessible computing platform implemented as a computing infrastructure of processors, storage, software, data access, and so forth that is maintained and accessible via the network 128, such as the Internet. The remote system 126 does not require end-user knowledge of the physical location and configuration of the system that delivers the services. Common expressions associated with these one or more servers may include "on-demand computing," "software as a service (SaaS)," "platform computing," "network-accessible platform," "cloud services," "data centers," and so forth.

The remote system 126 may have access to any of the data of the ECM 118, such as the pressure data 300, the tank level data 302, and/or the temperature data 304. Additionally, the remote system 126 may have access to the maps 234 and/or the algorithms 236. The remote system 126 may include components for analyzing the pressure data 300, the tank level data 302, and/or the temperature data 304 as received from the machine 100 (or other intermediate system, device, or server), for determining the notifications 124. In response, the remote system 126 may transmit the notification 124 to the machine 100 for display and/or may transmit the notification 124 to other services and/or databases. For example, the remote system 126 may schedule a servicing appointment for the machine 100 based on the determine health of integrity of the tank 102.

Given that the remote system 126 may have a computational capacity that far exceeds the machine 100, the remote system 126 may determine and/or track patterns amongst the pressure data 300, the tank level data 302, and/or the temperature data 304 for accurately determining the integrity of the tank 102. Data, or pressures, that deviate significantly from expected values may be of concern and flagged for service. Thus, the remote system 126 may continuously receive or record data for deciphering a health of the tank 102 for drawing conclusions and outputting notifications 124.

Network interface(s) 310 enable the ECM 118 to communicate via the one or more network(s) 128 with the remote system. The network interface(s) 310 may include a combination of hardware, software, and/or firmware and may include software drivers for enabling any variety of protocol-based communications, and any variety of wireline and/or wireless ports/antennas. For example, the network interface(s) 310 may comprise one or more of WiFi, cellular radio, a wireless (e.g., IEEE 802.1x-based) interface, a Bluetooth® interface, and the like.

The components of the machine 100, such as the ECM 118, may determine the integrity of the tank 102 through receiving pressure data 300, tank level data 302, and temperature data 304. The ECM 118, using the maps 234 and/or the algorithms 236, may process the data for determining whether the expected pressure rise is greater than the measured pressured rise. The differences there between may indicate the integrity of the tank 102. For example, if the measured pressure rise is greater than expected, this may indicate that the tank 102 is deteriorated, has a loss of vacuum, and so forth.

Figure 4:
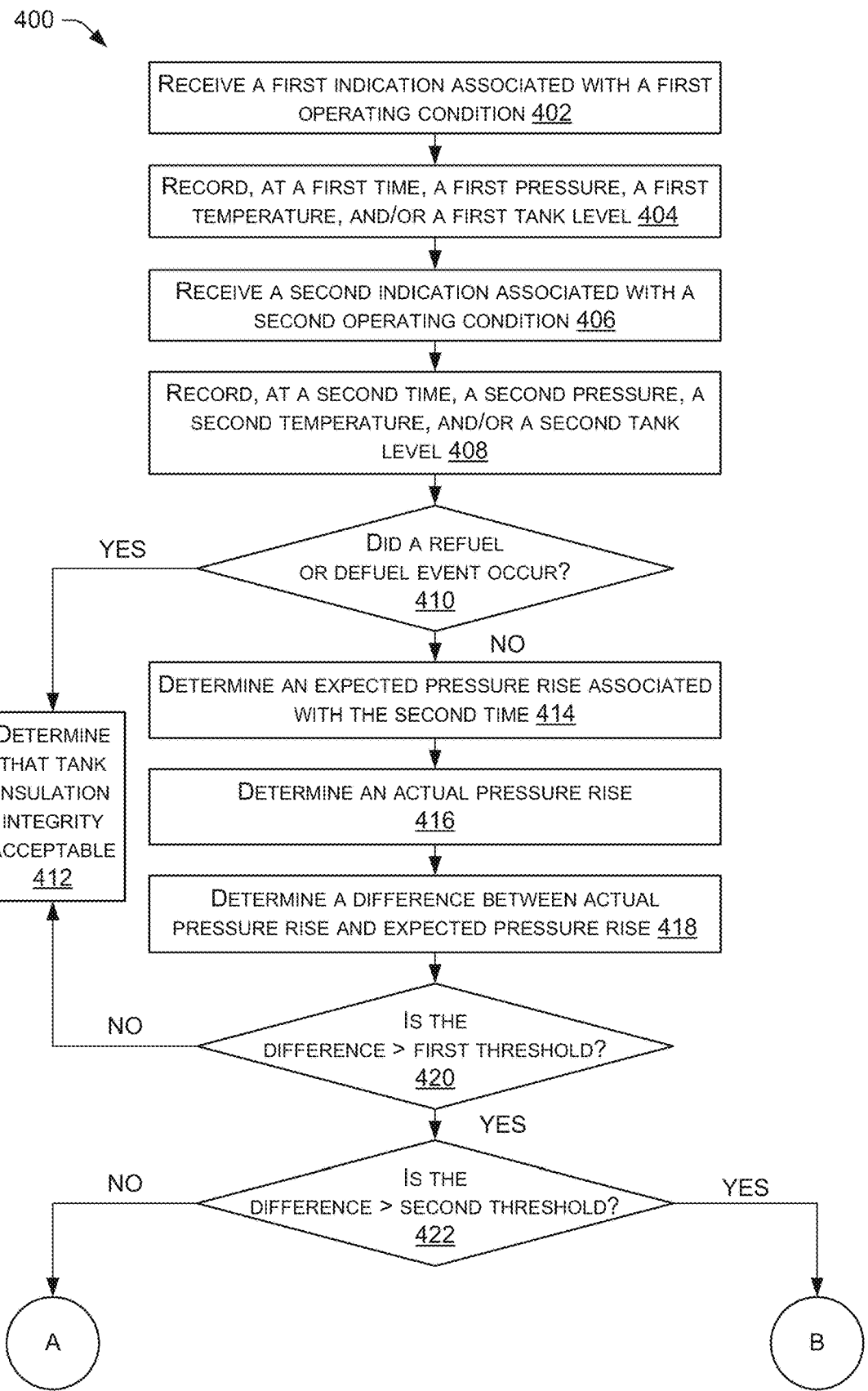
FIGS. 4 and 5 illustrate an example process associated with determining a deterioration of the tank of the machine of FIG. 1, according to an embodiment of the present disclosure.
Figure 5:
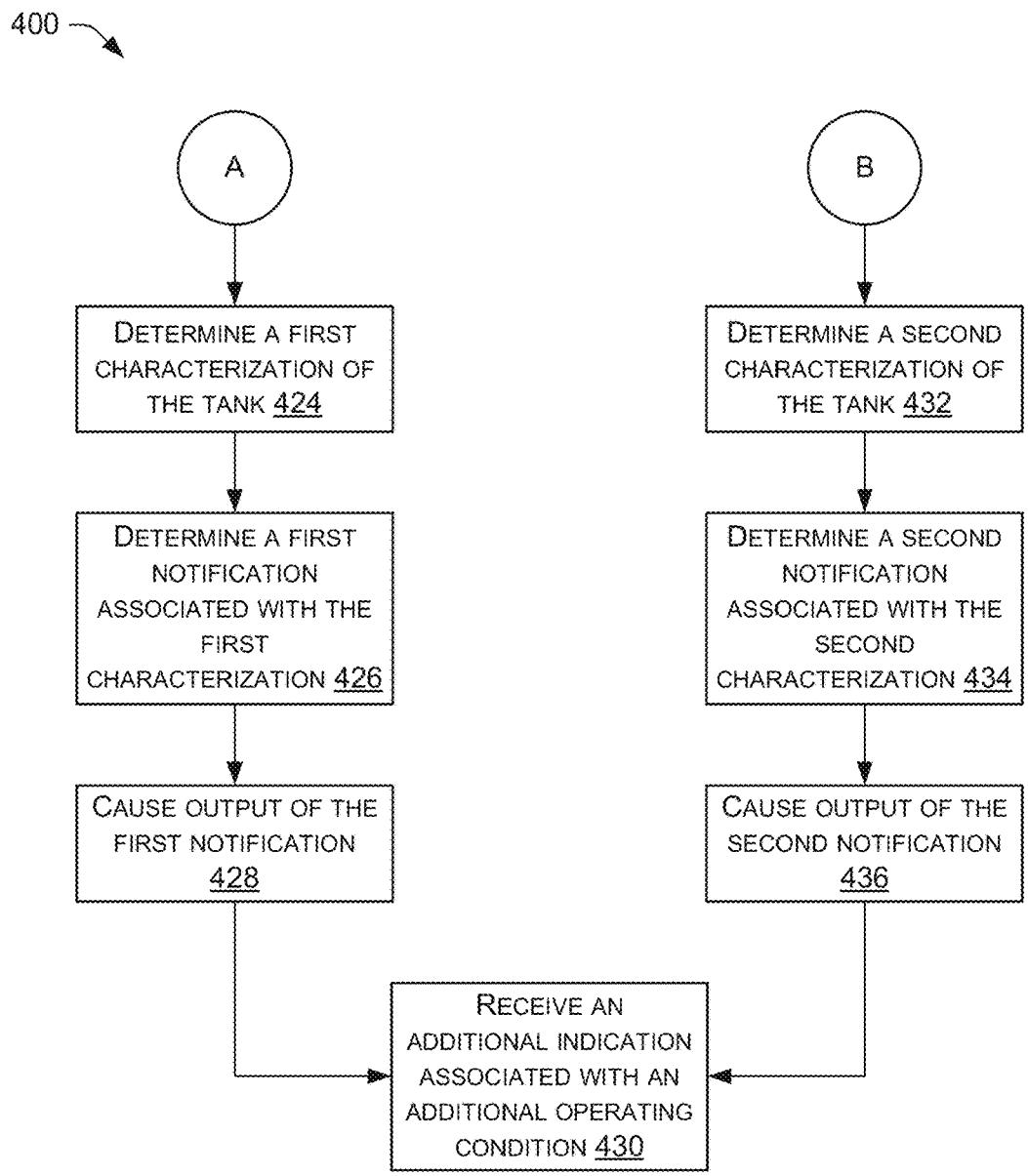
Figure 6:
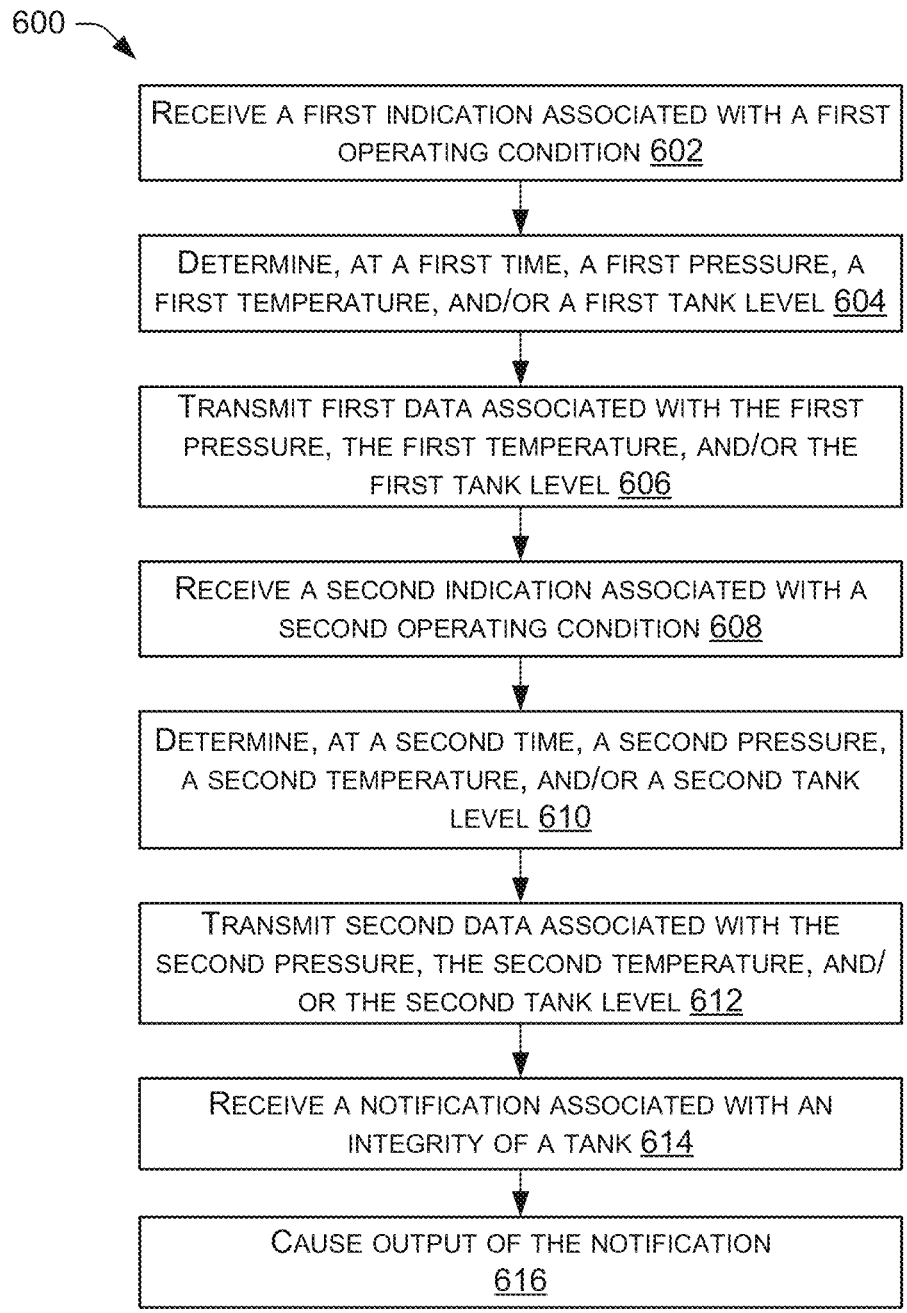
FIG. 6 illustrates an example process associated with determining a deterioration of the tank of the machine of FIG. 1, according to an embodiment of the present disclosure.

FIGS. 4-6 illustrate various processes related to determining an integrity of the tank 102. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, machines, architectures, and systems described in the examples herein, such as, for example those described with respect to FIGS. 1-3, although the processes may be implemented in a wide variety of other environments, machines, architectures, and systems.

FIGS. 4 and 5 illustrate an example process 400 for determining a deterioration of the tank 102 of the machine 100. In some instances, the process 400 may be performed by the ECM 118, individually or in conjunction with one or more other components of the machine 100, the fuel delivery system 200, and/or the remote system 126. For ease of description, and unless otherwise noted, the process 400 will be described below with respect to the ECM 118.

As shown in FIG. 4 and at operation 402, the ECM 118 may receive a first indication associated with a first operating condition. For example, the ECM 118 may receive an indication of a key-off event at the machine 100 or may otherwise determine (e.g., via receiving the indication) that the machine 100 is powering down. When the machine 100 is powered down, when the machine 100 is powering down, and/or if the engine 112 is powered down but while other components of the machine are still operational, the ECM 118 may receive the indication. In other words, the ECM 118 may receive an indication that the engine 118 has been turned off, such as by an operator turning an ignition key to the off position, pressing an on/off switch, and/or by any other mechanism to turn off the machine 100. In some instances, other components of the machine 100, such as electrical systems, heating/cooling systems, etc., may still be operational after the key-off event.

At operation 404, the ECM 118 may record, at a first time, a first pressure, a first temperature, and/or a first tank level. For example, the ECM 118 may record a first pressure, a first temperature, and/or a first tank level in response to the first operating condition (e.g., the key-off event). The ECM 118 may record the first pressure based at least in part on the pressure signal 214, the first temperature based at least in part on the temperature signal 222, and/or the first tank level based at least in part on the tank signal 218. In some instances, the first pressure, the first temperature, and/or the first tank level may be recorded as last measurements before the first operating condition or within a certain amount of time before the first operating condition (e.g., one second). Alternatively, the first pressure, the first temperature, and/or the first tank level may be recorded at a threshold amount of time after the first operating condition is determined, but while the sensor(s) 122 are still powered. The ECM 118 may store the first pressure, the first temperature, and/or the first tank level in the memory 232 associated with the ECM 118. Additionally, the ECM 118 may store an indication of a time associated with the first pressure, the first temperature, and/or the first tank level being generated.

At operation 406, the ECM 118 may receive a second indication associated with a second operating condition. For example, the ECM 118 may receive an indication of a key-on event at the machine 100 or may otherwise determine (e.g., via receiving the indication) that the machine 100 is powering up. In other words, the ECM 118 may receive an indication that the engine 112 of the machine 100 has been turned on, such as by an operator turning an ignition key to the on position, pressing an on/off switch, and/or by any other mechanism to power up the engine 112.

At operation 408, the ECM 118 may record, at a second time, a second pressure, a second temperature, and/or a second tank level. For example, the ECM 118 may record a second pressure, a second temperature, and/or a second tank level in response to the second operating condition (e.g., the key-on event). The ECM 118 may record the second pressure based at least in part on the pressure signal 214, the second temperature based at least in part on the temperature signal 222, and/or the second tank level based at least in part on the tank signal 218. In some instances, the second pressure, the second temperature, and/or the second tank level may be recorded at a threshold amount of time after the second operating condition. The ECM 118 may store the second pressure, the second temperature, and/or the first second level in the memory 232 associated with the ECM 118. Additionally, the ECM 118 may store a time associated with the second pressure, the second temperature, and/or the second tank level.

At operation 410, the ECM 118 may determine whether a refuel or a defuel event occurred. For example, the ECM 118 may compare the first tank level with the second tank level to determine a change or difference therebetween. The first tank level and the second tank level may be associated with the volume of LNG within the tank 102. In instances where the second tank level is greater than the first tank level, a refuel event may have occurred. For example, the tank 102 may have been refueled by the operator during the key-off event. Alternatively, in instances where the second tank level is less than the first tank level, a defuel event may have occurred. For example, the tank 102 may have been defueled during the key-off event (e.g., service, bad fuel, etc.). Alternatively, in some instances, if the second tank level is less than the first tank level, this may indicate that the tank 102 includes leaks, cracks, or a loss in vacuum. In some instances, if the first tank level and the second tank level are substantially or approximately the same (e.g., within 1%) the ECM 118 may determine the absence of a refuel or defuel event. If at operation 410, the process 400 determines that the defuel or refuel event occurred, the process 400 may follow the "YES" route and proceed to 412.

At operation 412, the process 400 may include determining that the tank insulation integrity is acceptable. For example, in the event that the refuel or defuel event occurred, the ECM 118 may determine that the tank 102 is not deteriorating and/or has a deterioration that is within an acceptable range or threshold. In such instances, the ECM 118 may cause a notification 124 to be output to the operator indicating such, or may refrain from outputting the notification 124 to the operator. Alternatively, if at operation 410 the process 400 determines that the defuel or refuel event did not occur, the process 400 may follow the "NO" route and proceed to 414.

At operation 414, the ECM 118 may determine an expected pressure rise associated with the second time. For example, the ECM 118 may determine an expected change in pressure from the first operating condition (e.g., the key-off event) to the second operating condition (e.g., the key-on event). As discussed herein, the expected change in pressure may be determined based at least in part on the maps 234 and/or the algorithms 236. In some instances, the ECM 118 may utilize the first pressure, the first temperature, and/or the first tank level as one or more inputs for looking up or calling the maps 234 to determine the expected pressure rise. For example, given the first pressure, the first temperature, and/or the first tank level, the ECM 118 may utilize the maps 234 to determine an expected pressure rise in the tank over a period of time, or at the second operating condition. In other words, at the second operating condition (i.e., at the second time), the ECM 118 may determine (e.g., using time stamps) an amount of time having lapsed since the first operating condition (i.e., at the first time). This amount of time (i.e., delta) may be correlated with an expected or predicted rise in pressure from the first operating condition to the second operating condition.

At operation 416, the ECM 118 may determine an actual pressure rise. For example, the ECM 118 may compare the first pressure with the second pressure to determine a difference therebetween. In some instances, the ECM 118 may subtract the second pressure recorded at the second operating condition from the first pressure recorded at the first operating condition to determine the change in pressure. Additionally, or alternatively, the ECM 118 may subtract the pressure recorded at the first operating condition from the second operating condition to determine the change in pressure.

At operation 418, the ECM 118 may determine a difference between the actual pressure rise and the expected pressure rise. For example, the ECM 118 may compare the expected pressure rise (or expected change in pressure) as determined at 414 with the actual pressure rise as determined at 416. Comparison of the expected pressure rise and the actual pressure rise may indicate a difference therebetween.

At operation 420, the ECM 118 may determine whether the difference is greater than a first threshold. For example, the ECM 118 may compare the difference the difference determined at operation 418 to a first threshold. The first threshold may be associated with a first change in pressure (e.g., 50 psi). Additionally, or alternatively, the first threshold may be a factor, multiple, or scale of the first pressure (e.g., 125% of the first pressure, 150% of the first pressure, etc.). In some instances, the first threshold may be determined, or set, based at least in part on the first pressure. Still, in some instances, the first threshold may be determined based on characteristics of the tank 102 (e.g., geometry of the tank 102).

By way of example, if the first pressure is 125 psi the first threshold may be 25 psi. If the rise is pressure between the first operating condition and the second operating condition is greater than 25 psi, such as 50 psi, the difference may be greater than the first threshold. In other words, a certain amount of rise in pressure may be expected between the first operating condition and the second operating condition and tolerances therebetween may be accounted for. However, if this rise is greater than the first threshold, this may indicate a deterioration of the tank 102. If at operation the process 400 determines that the difference is less than the first threshold, the process 400 may follow the "NO" route and proceed to 412. Alternatively, if the process 400 determines that the difference is greater than the first threshold, the process 400 may follow the "YES" route and proceed to 422.

At 422, the ECM 118 may determine whether the difference is greater than a second threshold. For example, the ECM 118 may compare the difference between the expected pressure rise and the actual pressure rise against a second threshold. In some instances, the second threshold may be greater than the first threshold. By way of example, if the first threshold is 25 psi, the second threshold may be 50 psi or 75 psi. The second threshold may be associated with a second change in pressure, a factor, multiple, or scale of the first pressure (e.g., 200% of the first pressure, etc.). In some instances, the second threshold may be determined, or set, based at least in part on the first pressure and/or based on characteristics of the tank 102. The multiple thresholds may be used for characterizing the integrity of the tank. For example, if the difference between the expected pressure rise and the actual pressure rise against is greater than the first threshold (e.g., 25 psi), but less than the second threshold (e.g., 75 psi), this may correspond to a first characterization of the tank 102. In some instances, the first characterization may be associated with a certain rating or integrity of the tank 102, such as "fair." However, if the difference between the expected pressure rise and the actual pressure rise against is greater than the first threshold and is also greater than the second threshold, this may correspond to a second characterization of the tank 102. For example, the second characterization may be associated with a certain rating or integrity, such as "poor."

If at 422, the ECM 118 determines that the difference is less than the second threshold, the process 400 may follow the "NO" route and proceed to "A" which is discussed in further detail with reference to FIG. 5. Alternatively, if the process 400 determines that the difference is greater than the second threshold, the process 400 may follow the "YES" route and proceed to "B" which is also discussed in further detail with reference to FIG. 5.

FIG. 5 illustrates a continuation of FIG. 4 and the process 400. First, following the "NO" route from 422 and "A," the process 400 may proceed to 424. At 424, the ECM 118 may determine a first characterization of the tank. For example, based at least in part on the difference between the first pressure and the second pressure and the difference being greater than the first threshold, but less than the second threshold, the ECM 118 may determine the first characterization of the tank 102. The first characterization may represent an integrity, degradation, insulation, or other properties of the tank 102. In some instances, the first characterization may indicate a remaining life of the tank 102, an amount of time the tank 102 may hold fuel at a desired pressure, and/or whether the tank 102 needs to be serviced (e.g., reinsulated and/or vacuumed). In other words, based on the difference in the pressure rise within the tank 102, the tank 102 may be characterized to determine a remaining useful life of the tank 102. For example, if the ECM 118 determines that the difference is greater than the first threshold, but less than the second threshold, this may indicate that the difference is negligible or not of immediate concern.

At 426, the ECM 118 may determine a first notification associated with the first characterization. For example, the ECM 118 may determine a first notification to output to the operator associated with the first characterization. Continuing with the above example, the first notification may indicate a remaining life of the tank 102, whether the tank 102 needs to be serviced, a health of the tank (e.g., good, poor, bad, etc.) and so forth. For example, the first notification may indicate that the operator should schedule service for the tank 102 within a period of time (e.g., one month).

At 428, the ECM 118 may cause output of a first notification associated with the first characterization. For example, the ECM 118 may cause the first notification to be displayed on the UI 120 within the operator station 116. In response, the operator may take various actions or may not take any actions. For example, if the first notification indicates that the first characterization is acceptable or not of concern, the first notification may serve to inform the operator of the remaining life of the tank 102. In other instances, the operator may perform one or more actions, such as scheduling maintenance on the tank 102 to repair or re-establish the vacuum through a pump down process.

At 430, the ECM 118 may receive an additional indication associated with an additional operating condition. For example, the process 400 may loop to 402 to record pressure, temperature, and tank level when the next key-off event occurs, or alternatively, at another time. In this way, the ECM 118 may continuously determine the deterioration or integrity of the tank 102 throughout a lifespan of the tank 102.

Alternatively, following the "YES" route from 422 and "B," the process 400 may proceed to 432. At 432, the ECM 118 may determine a second characterization of the tank. For example, based at least in part on the difference between the first pressure and the second pressure and the difference being greater than the first threshold and greater than the second threshold, the ECM 118 may determine the second characterization of the tank 102. The second characterization may represent an integrity, degradation, insulation, or other properties of the tank 102. In some instances, the second characterization may indicate a remaining life of the tank 102, an amount of time the tank 102 may hold fuel at a desired pressure, and/or whether the tank 102 needs to be serviced (e.g., reinsulated and/or vacuumed). For example, if the ECM 118 determines that the difference is greater than the first threshold and greater than the second threshold, this may indicate that the difference is of concern. Accordingly, the second characterization may serve as a warning or alert to the operator as to the integrity of the tank 102.

At 434, the ECM 118 may determine a second notification associated with the second characterization. For example, the ECM 118 may determine a second notification to output to the operator associated with the second characterization. Continuing with the above example, the second notification may indicate a warning that the tank 102 is deteriorated, has low amount of remaining life, etc. and needs to be replaced or serviced immediately. The deterioration of the tank 102, as indicated by the low hold time, may be indicative that the vacuum of the tank 102 has been compromised. In such instances, the fuel within the tank 102 may boil off quickly (e.g., via an opening of the release valve 238). This may lead to increased fuel costs and/or carbon emissions.

At 436, the ECM 118 may cause output of a second notification associated with the second characterization. For example, the ECM 118 may cause the second notification to be displayed on the UI 120 within the operator station 116. In response, the operator may take various actions associated with the second notification. For example, if the second notification indicates that the insulating properties of the tank 102 are of concern, the second notification may serve to inform the operator to schedule service to repair the tank 102. From operation 434, the process 400 may include proceeding to 430 to receive an additional indication associated with an additional operating condition.

Although the above discussion is with regard to comparing a rise in pressure between the first operating condition and the second operating condition, the relative pressures may be compared against thresholds. For example, the first threshold may be 150 psi, and if the second pressure is greater than 150 psi, the first notification may be output. Moreover, although the process 400 illustrates comparing the difference in pressure rise against two thresholds, the process 400 may compare the difference against more than two thresholds or less than two thresholds. In such instances, the process 400 may determining characterizations 308 of the tank 102 based on the difference being less than or greater than certain thresholds. In this way, the ECM 118 may output respective notifications 124 associated with the remaining life of the tank 102.

As such, the process 400 illustrates a scenario for determining a deterioration of the tank 102 and causing output of a notification to the operator. The notification may serve to warn, alert, or notify the operator as to the integrity or deterioration of the tank 102. Such notification may be useful in scheduling maintenance, repair, or replacement of the tank 102. In some instances, the integrity of the tank 102 may be associated with the vacuum properties of the tank 102 and/or the physical structural integrity of the tank 102. For example, within the tank 102, the vacuum integrity will naturally deteriorate over time as particles permeate through walls of the tank 102 (e.g., O-rings, seams, etc.). In these instances, a vacuum pump may be attached to the tank 102 and the vacuum may be re-established. A physical structural integrity of the tank 102 may be associated with microcrack, visible cracks, frosting, cracks may also occur on the inner vessel of the tank 102 which is not possible to see without tank dissection. Regardless, in either situation, the integrity of the tank 102 may be determined for use in scheduling maintenance, repair, or replacement.

FIG. 6 illustrates an example process 600 for determining a notification based on a determined integrity of the tank 102. At operation 602, the ECM 118 may receive a first indication associated with a first operating condition. For example, the ECM 118 may receive an indication of a key-off event at the machine 100 or may otherwise determine (e.g., via receiving the indication) that the machine 100 is powering down. When the machine 100 is powered down, when the machine 100 is powering down, and/or if the engine 112 is powered down but while other components of the machine are still operational, the ECM 118 may determine receive the indication.

At operation 604, the ECM 118 may determine, at a first time, a first pressure, a first temperature, and/or a first tank level. For example, the ECM 118 may determine a first pressure, a first temperature, and/or a first tank level in response to the first operating condition (e.g., the key-off event). The ECM 118 may record the first pressure based at least in part on the pressure signal 214, the first temperature based at least in part on the temperature signal 222, and/or the first tank level based at least in part on the tank signal 218. In some instances, the first pressure, the first temperature, and/or the first tank level may be recorded as last measurements before the first operating condition or within a certain amount of time before the first operating condition (e.g., one second).

At operation 604, the ECM 118 may transmit first data associated with the first pressure, the first temperature, and/or the first tank level. For example, the ECM 118 may transmit, or otherwise cause the machine 100 to transmit, the first pressure, the first temperature, and/or the first tank level to the remote system 126. The remote system 126 may be configured to analyze the first pressure, the first temperature, and/or the first tank level to determine a hold time of the tank 102.

At operation 606, the ECM 118 may receive a second indication associated with a second operating condition. For example, the ECM 118 may receive an indication of a key-on event at the machine 100 or may otherwise determine (e.g., via receiving the indication) that the machine 100 is powering up. In other words, the ECM 118 may receive an indication that the engine 112 of the machine 100 has been turned on, such as by an operator turning an ignition key to the on position, pressing an on/off switch, and/or by any other mechanism to power up the engine 112.

At operation 608, the ECM 118 may determine, at a second time, a second pressure, a second temperature, and/or a second tank level. For example, the ECM 118 may determine a second pressure, a second temperature, and/or a second tank level in response to the second operating condition (e.g., the key-on event). The ECM 118 may determine the second pressure based at least in part on the pressure signal 214, the second temperature based at least in part on the temperature signal 222, and/or the second tank level based at least in part on the tank signal 218. In some instances, the second pressure, the second temperature, and/or the second tank level may be recorded at a threshold amount of time after the second operating condition.

At operation 610, the ECM 118 may transmit second data associated with the second pressure, the second temperature, and/or the second tank level. For example, the ECM 118 may transmit, or otherwise cause the machine 100 to transmit, the second pressure, the second temperature, and/or the second tank level to the remote system 126. The remote system 126 may be configured to analyze the second pressure, the second temperature, and/or the second tank level relative to the first pressure, the first temperature, and/or the first tank level, respectively.

For example, the remote system 126 may compare the first tank level and the second tank level to determine whether a fill event of the machine 100 occurred. Additionally, the remote system 126 may have access to the maps 234 and/or the algorithms 236 for determining a predicted pressure increase, or a predicted pressure difference, between the first time (i.e., the key-off event) and the second time (i.e., the key-on event). The remote system 126 may therein compare the predicted pressure increase, or the predicted pressure difference, with the actual pressure difference at the second time. Additionally, the remote system 126 may compare the predicted pressure increase, or the predicted pressure difference, to one or more thresholds 306 for determining a characterization 308 of the tank 102. As discussed above, the characterization 308 may be associated with an integrity of the tank 102 or the ability of the tank 102 to hold a vacuum.

At operation 612, the ECM 118 may receive a notification associated with an integrity of the tank. For example, the ECM 118 (or the machine 100) may receive a notification 124 that is associated with the integrity or hold time of the tank 102. In some instances, the notification 124 may be determined by the remote system 126 as part of characterizing the tank 102.

At operation 614, the ECM 118 may cause output of the notification. For example, the ECM 118 may cause the UI 120 to display the notification 124. The notification 124 may serve to inform the operator about the health, deterioration, or integrity of the tank 102. Such notification 124 may cause the operator to schedule maintenance on the tank 102 and/or inform the operator that the integrity of the tank 102 is acceptable.

INDUSTRIAL APPLICABILITY

The present disclosure describes systems and methods for determining and indicating a hold time or remaining life of tanks 102 for machines 100, such as mining machines (e.g., a mining truck) that operates using LNG and/or LNG blends. The machines 100 that utilize LNG provide several advantages, such as reduced carbon, particulates, and/or VOC emissions. The systems and methods disclosed herein allow for determining the fuel level within the tank 102, hold times of the fuel within the tank 102, and lifespan of the of the machine 100 in non-intrusive manner for use in determining notifications, maintenance, or warnings.

Utilizing the systems and methods disclosed herein, the viability of the machines 100 for construction, mining, farming, and other activities is improved. For example, conventionally, the machines 100 are required to be taken out of service for extended periods of time or intrusive operations are performed on the tank 102 to determine hold times, insulation properties, and/or vacuum seals. Comparatively, the systems and methods disclosed herein allow for the comparison of an actual pressure rise and an expected pressure rise within the tank between two periods of time. This comparison, or a difference between the actual pressure rise and the expected pressure rise, allows for a determination of whether the tank is stores LNG as expected. In other words, if the actual pressure rise is greater than the expected pressure rise, this may indicate a leak or fracture within the tank, and/or whether a vacuum of the tank has been compromised. In some instances, the difference may be compared to one or more thresholds for outputting different notifications. For example, if the difference is within a predetermined amount above the expected pressure rise, the notification may indicate to service the tank 102 within a certain period of time. Alternatively, if the difference is greater than the predetermined amount, the notification may indicate to replace the tank 102. The systems and methods disclosed herein may continuously determine the difference between the actual pressure rise and the expected pressure rise in response to operating conditions, such key-off and key-on event, and without decommissioning the machines 100. Thus, the systems and methods disclosed herein lend themselves to accurately measuring hold times for holding cryogenic fuels, such as LNG within tanks, such as double-walled vacuum fuel tank. This leads to improved levels of worker and capital efficiency, greater uptime and field usage of construction equipment, and greater efficiency of construction, mining, agriculture, and/or transportation projects. Additionally, by measuring the integrity of the tank 102 and notifying of maintenance, carbon emissions and/or fuel expenses may be reduced.

Although the systems and methods of the machines 100 are discussed in the context of a mining truck, it should be appreciated that the systems and methods discussed herein may be applied to a wide array of machines and vehicles across a wide variety of industries, such as construction, mining, farming, transportation, military, combinations thereof, or the like. For example, the fuel level measurement system disclosed herein may be applied to an excavator in the mining industry or a harvester in the farming industry.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A machine, comprising:
an engine;
a fuel tank configured to hold a cryogenic fuel associated with the engine;
a pressure sensor fluidly connected to the fuel tank;
a temperature sensor;
a fuel sensor fluidly connected to the fuel tank; and
an electronic control module (ECM) in communication with the engine, the pressure sensor, the temperature sensor, and the fuel sensor, the ECM being configured to:
receive, at a first time, first pressure data from the pressure sensor indicating a first pressure within the fuel tank,
receive, at the first time, first temperature data from the temperature sensor indicating a first temperature of an environment in which the machine is disposed,
receive, at the first time, first fill data from the fuel sensor indicating a first fuel level within the fuel tank,
determine, based at least in part on the first pressure data, the first temperature data, and the first fill data, a predicted pressure rise rate within the fuel tank,
receive, at a second time different from the first time, second pressure data from the pressure sensor indicating a second pressure within the fuel tank,
receive, at the second time, second temperature from the temperature sensor indicating a second temperature of the environment,
receive, at the second time, second fill data from the fuel sensor indicating a second fuel level within the fuel tank,
determine an amount of time between the first time and the second time,
determine, based at least in part the predicted pressure rise rate and the amount of time, a predicted pressure within the fuel tank,
generate a notification based at least in part on the predicted pressure, the notification being associated with the fuel tank; and
wherein the notification indicates at least one of:
an amount of time within which to schedule maintenance of the fuel tank;
a remaining lifespan of the fuel tank; or
a warning associated with the fuel tank.

2. The machine of claim 1, wherein the ECM is further configured to:
  determine a first difference between the first pressure data and the second pressure data,
  determine a second difference between the predicted pressure and the first difference; and
  determine that the second difference meets or exceeds a threshold, and
  wherein the notification is further based at least in part on the second difference meeting or exceeding the threshold.

3. The machine of claim 2, wherein the ECM is further configured to:
  compare the second difference to a threshold; and
  determine at least one of:
    a first characterization of the fuel tank based at least in part on the second difference being less than the threshold, the first characterization being associated with a first hold time of the fuel tank, or
    a second characterization of the fuel tank based at least in part on the second difference meeting or exceeding the threshold, the second characterization being associated with a second hold time of the fuel tank that is less than the first hold time.

4. The machine of claim 1, wherein the first time is associated with a key-off event of the machine and the second time is associated with a key-on event of the machine.

5. The machine of claim 1, wherein the ECM is further configured to determine that the first fuel level and the second fuel level are substantially equal, and wherein the notification is further based at least in part on the first fuel level and the second fuel level being substantially equal.

6. A system, comprising:
  one or more processors; and
  one or more non-transitory computer-readable media storing instructions that, when executed by the one or more processors, cause the one or more processors to perform acts comprising:
    receiving first data indicating a first pressure within a fuel tank of a machine;
    receiving second data indicating a first fuel level within the fuel tank;
    receiving third data indicating a second pressure within the fuel tank;
    determining, based at least in part on the first pressure and the first fuel level, an expected pressure within the fuel tank;
    determining a first difference between the first pressure and the second pressure;
    determining a second difference between the first difference and the expected pressure; and
    based at least in part on the second difference, causing output of a notification indicating at least one of:
      a first hold time of fuel within the fuel tank, or
      a second hold time of fuel within the fuel tank, the second hold time being less than the first hold time.

7. The system of claim 6, wherein the first data is received at a first time and the third data is received at a second time that is after the first time, the acts further comprising determining an amount of time between the first time and the second time, and wherein the expected pressure is determined based at least in part on the amount of time.

8. The system of claim 6, wherein:
  causing output of the notification indicating the first hold time is based least in part on the second difference being less than a threshold, and
  causing output of the notification indicating the second hold time is based least in part on the second difference meeting or exceeding the threshold.

9. The system of claim 6, wherein:
  the first data and the second data are received in response to a key-off event of the machine; and
  the third data is received in response to a key-on event of the machine.

10. The system of claim 9, wherein:
  the first data and the second data are received at least one of:
    commensurate with the key-off event,
    within a first threshold amount of time before the key-off event, or
    within a second threshold amount of time after the key-off event; and
  the third data is received at least one of:
    commensurate with the key-on event, or
    within a third threshold amount of time after the key-on event.

11. The system of claim 6, the acts further comprising:
  receiving fourth data indicating a second fuel level within the fuel tank; and
  determining a third difference between the first fuel level and the second fuel level, and
  wherein causing output of the notification is based at least in part on the third difference.

12. The system of claim 6, the acts further comprising receiving fourth data indicating a temperature of an environment of the machine, and wherein the expected pressure within the fuel tank is determined based at least in part on the temperature.

13. The system of claim 6, the acts further comprising determining, based at least in part on the second difference, a characterization of the fuel tank that indicates a remaining lifespan of the fuel tank.

14. The system of claim 6, the acts further comprising:
  determining that the second difference meets or exceeds a first threshold; and
  determining that at least one of:
    the second difference is less than a second threshold, or
    the second difference meets or exceeds the second threshold; and
  wherein:
    causing output of the notification indicating the first hold time is based at least in part on the second difference being less than the second threshold, and
    causing output of the notification indicating the second hold time is based at least in part on the second difference meeting or exceeding the second threshold.

15. A fuel system of a machine, comprising:
  a fuel tank configured to hold fuel;
  a pressure sensor fluidly connected to the fuel tank; and
  an electronic control module (ECM) in communication with the pressure sensor, the ECM being configured to:
    receive information from the pressure sensor, the information indicating:
      a pressure within the fuel tank at a first time, and
      a pressure within the fuel tank at a second time;
    determine a change in pressure within the fuel tank based on the information;

determine a predicted change in pressure within the fuel tank, the predicted change in pressure being associated with the first time and the second time;

determine that a difference between the change in pressure and the predicted change in pressure is greater than a threshold;

determine, based at least in part on the difference being greater than the threshold, a notification to be displayed; and cause display of the notification; and wherein the notification is associated with at least one of:

an amount of time within which to schedule maintenance for the fuel tank;

a remaining lifespan of the fuel tank; or a warning associated with the fuel tank.

16. The fuel system of the machine of claim 15, wherein the ECM is further configured to:

receive, at the first time, a first temperature of an environment of the machine and a first pressure of the fuel; and select a model associated with mapping the first temperature and the first pressure to the predicted change in pressure.

17. The fuel system of the machine of claim 15, wherein the ECM is further configured to:

determine a change in a fuel level of the fuel between the first time and a second time;

determine, based at least in part on the change in the fuel level, an absence of a fill event occurred between the first time and the second time; and determine the change in pressure and the predicted change in pressure is based at least in part on determining the absence of the fill event.

18. The fuel system of the machine of claim 15, wherein the notification is associated with one of:

a first hold time of the fuel within the fuel tank based at least in part on the change in the pressure and the predicted change in pressure being less than a second threshold, or a second hold time of the fuel within the fuel tank based at least in part on the change in the pressure and the predicted change in pressure meeting or exceeding the second threshold, the second hold time being less than the first hold time.

* * * * *